United States Patent [19]

Tseng et al.

[11] Patent Number: 5,239,053
[45] Date of Patent: Aug. 24, 1993

[54] PURIFICATION OF VINYL LACTAM POLYMERS

[75] Inventors: Susan Y. Tseng, Staten Island, N.Y.; William L. Mandella, Boonton, N.J.; Terry E. Smith, Morristown, N.J.; Robert B. Login, Oakland, N.J.; Paul D. Taylor, West Milford, N.J.

[73] Assignee: ISP Investments Inc., Wilmington, Del.

[21] Appl. No.: 834,968

[22] Filed: Feb. 14, 1992

[51] Int. Cl.$^5$ ............................................... C08F 6/10
[52] U.S. Cl. ................................ 528/483; 528/486; 528/490
[58] Field of Search ................ 528/486, 490, 483, 486

[56] References Cited

U.S. PATENT DOCUMENTS

| | | | |
|---|---|---|---|
| 3,017,393 | 1/1962 | Ney | 528/486 |
| 3,072,615 | 1/1963 | Riedesel | 528/486 |
| 3,701,764 | 10/1972 | Hargitay | 528/486 |
| 4,187,370 | 2/1980 | Anshus et al. | 528/486 |
| 4,264,501 | 4/1981 | Bour et al. | 528/490 |
| 4,795,802 | 1/1989 | Nuber et al. | 528/490 |

Primary Examiner—Joseph L. Schofer
Assistant Examiner—Tom Weber
Attorney, Agent, or Firm—Marilyn J. Maue; Joshua J. Ward

[57] ABSTRACT

Vinylpyrrolidone and vinylcaprolactam residual monomers are removed from their respective crosslinked and non-crosslinked, vinyl lactam homopolymers, vinyl lactam copolymers and vinyl lactam terpolymers containing substantially contaminating amounts of residual vinylpyrrolidone or vinylcaprolactam monomer by a process which comprises (1) adjusting the pH of the vinyl lactam polymer slurry containing from about 1 to about 30 wt. % solids or a solution of the vinyl lactam polymer to a pH of less than 5 with an acid selected from the group of sulfuric, phosphoric, carbonic, formic and acetic acids and mixtures thereof; (2) reacting the acid with the residual vinyl lactam monomer at a temperature of from about 50° to about 150° C. for a period of from about 0.5 to about 10 hours until the residual monomer is reduced to less than 5 ppm and (3) drying said solids to a substantially pure vinyl lactam polymeric product in a free-flowing particulate state.

23 Claims, No Drawings

PURIFICATION OF VINYL LACTAM POLYMERS

In one aspect the invention relates to a process for the substantially complete removal of residual vinylpyrrolidone or vinylcaprolactam monomer from a vinyl lactam polymeric product containing up to 50,000 parts per million of said residual monomer to produce a substantially pure, particulate polymeric product as a free-flowing powder. In another aspect the invention relates to a vinylpyrrolidone or vinylcaprolactam polymeric product having a residual monomer content less than 5 ppm.

BACKGROUND OF THE INVENTION

For toxicological and odorous reasons, crosslinked and non-crosslinked vinylpyrrolidone polymers should be as free as possible of unreacted monomer. The absence of vinylpyrrolidone residual monomer is particularly significant for cosmetic and pharmaceutical applications; however, conventional methods for minimizing residual monomer content in vinylpyrrolidone polymers are only successful in obtaining a reduction to 100–1,000 ppm and are directed to the separate addition of initiator and/or temperature increase toward the end of the polymerization cycle as described in U.S. Pat. No. 2,665,271 and 4,182,851. Since, these methods have not been able to reduce the residual monomer in the particulate polymeric product to a level of a few parts per million, the use of such polymers has been somewhat limited Accordingly it is an object of this invention to provide a process for the reducing residual monomer content of a vinylpyrrolidone or vinylcaprolactam polymeric product to a level of not more than 5 parts per million (ppm) and in some cases to less than 1 ppm.

Another object of this invention is to provide an economical and commercially feasible process for producing a substantially pure vinylpyrrolidone or vinylcaprolactam polymeric product in a free-flowing particulate state.

Another object of this invention is to produce substantially pure vinylpyrrolidone polymer suitable for use in pharmaceutical and cosmetic applications These and other objects of the invention will become apparent from the following description and disclosure.

THE INVENTION

In accordance with this invention there is provided a process which produces a substantially pure vinyl lactam polymer, i.e. a N-vinylpyrrolidone or N-vinylcaprolactam polymer, by treating an aqueous slurry containing from about 1 to about 30 wt. % solids of said crosslinked polyvinyl lactam particles or an aqueous solution of said non-crosslinked vinyl lactam polymer, copolymer or terpolymer containing substantial quantities, up to about 20,000 ppm of residual vinylpyrrolidone or vinylcaprolactam monomer with an acid selected from the group of carbonic, sulfuric, phosphoric, formic and acetic acids and mixtures thereof at a pH of less than 5; reacting the resulting mixture at a temperature of from about 50° C. to about 150° C. for a period sufficient to reduce the residual monomer content of the polymeric particles to less than 5 ppm, preferably less than 1 ppm, and drying the treated solids to a free-flowing powder of pure vinyl lactam polymer. Generally, the process comprises mixing the acid and the aqueous polymer slurry or solution and holding the acid containing slurry or solution at an elevated temperature for a period of from about 0.5 to about 10 hours. The preferred conditions for residual monomer removal include a temperature of between about 80° and about 120° C., a pH of from about 2 to about 3.5 and a contact time of from about 1 to about 5 hours. In the present process, the time and temperature are inversely related.

The liquid acid agents of this invention are generally employed as a 5 to 50 wt. % solutions, preferably a 20 to 30 wt. % solutions, in a suitable aqueous solvent or diluent such as water, or in an aqueous solution of a $C_1$ to $C_4$ alkanol. In all cases, the amount of acid agent employed depends on the degree of monomer contamination in the polymer as well as the initial pH and buffering capacity of the polymer solution; however, between about 150 ppm and about 700 ppm acid on 100% active basis/total weight of monomer, is satisfactory.

When carbonic acid is employed as the acid agent and is formed in situ by injection of carbon dioxide gas, the carbon dioxide is dissolved and forms carbonic acid under a pressure of from about 15 to about 300 psi, preferably from about 30 to about 100 psi, thus establishing a carbonic acid vapor-liquid equilibrium and insuring substantially complete reaction of monomer and acid.

Mixtures of the acid treating agents can also be employed in the present process. For example, between about 150 and about 500 ppm of formic acid can be added with the polymeric slurry or solution and the system pressurized with carbon dioxide gas at a lower pressure than used when carbon dioxide is the sole acid agent, e.g. pressurizing with from about 0.2 to about 5 bars of carbon dioxide, gives good results. The reactor contents are then agitated at the above temperature conditions for a period of from about 0.5 to about 10 hours or until the residual monomer content is less than 5 ppm. Other mixtures of the above liquid acids or liquid and gaseous acids can also the employed in any proportion when desired.

The vinyl lactam monomers of this invention are vinylpyrrolidone, vinylcaprolactam or either of these species substituted on a carbon of the heterocyclic ring with lower alkyl. Of these N-vinyl lactams, those having from 6 to 10 carbon atoms are preferred.

The crosslinked polyvinylpyrrolidone or polyvinylcaprolactam polymers treated as an aqueous slurry according to the present process, include for example POLYCLAR ®, supplied by ISP Technologies Inc., or other proliferously polymerized vinylpyrrolidone or vinylcaprolactam produced at a relatively high temperature, e.g. 100°–150° C. under alkaline conditions, e.g. a pH greater than about 9. Polyvinylpyrrolidones or polyvinylcaprolactams crosslinked with extraneous polyfunctional monomers are also suitable candidates for the present process and are obtained by reacting a polyfunctional monomer with the respective vinyl lactam under similar conditions. Suitable polyfunctional monomers include polyolefinic compounds such as 1,4-butadiene, diallyl ethylene glycols, diallyl acrylates, butanediol-diacrylates, diallyl phthalate, N,N-methylenebisacrylamide, divinyl benzene, 1-vinyl-3-ethylidene pyrrolidone, ethylidene-bis-3(N-vinylpyrrolidone), N,N'-divinyl-2-imidazolidone, and the like.

Initiators generally employed in the crosslinking process are of the free radical type which include azobis(isobutyronitrile), azobis(isovaleronitrile) and peroxides such as benzoyl peroxide, di-t-butyl peroxide, cumyl peroxides, etc.

The crosslinked product of the above reactions usually contains between about 100 and about 20,000 ppm of unreacted vinylpyrrolidone (VP) or vinylcaprolactam (VCL) monomer; however, at well below optimum synthesis conditions, crosslinked products containing as much as 50,000 ppm or more of residual lactam monomer may be produced. In such uncommon cases the crosslinked product is first washed with water to reduce the monomer contaminant level to at least 20,000 ppm, preferably to about 10,000 ppm or less, before treating with the acid agent. Generally, crosslinked polyvinylpyrrolidone (PVPP) or polyvinylcaprolactam (PVPCL) is produced in the form of an aqueous slurry containing from about 1 to about 30 wt. % solids, preferably from about 10 to about 20 wt. % solids. The slurry, when formed in the synthesis reactor, may be diluted as required for adequate agitation, after which it is filtered and dried to a particulate product containing substantial quantities of residual VP or VCL monomer.

In accordance with the present process, the crosslinked vinylpyrrolidone polymeric particles, produced as an aqueous suspension containing up to about 20,000 ppm VP or VCL can be directly treated with the present acid agent. Alternatively, the suspension can be filtered, washed, optionally dried and an aqueous slurry of the polymer particles in about 1–30 wt. % concentration prepared separately. The aqueous medium of the polymeric suspension can be water or an aqueous alcohol solution. After acid treatment, the slurry can be neutralized, usually with an inorganic base, before filtering and drying.

The term "vinyl lactam polymer" as used herein is intended to include homopolymers, copolymers, and terpolymers of vinylpyrrolidone or vinylcaprolactam. Thus, the present treating process is beneficial in the treatment of all types vinylpyrrolidone or vinylcaprolactam containing polymers which contain more than 5 ppm of residual monomer. Examples of vinylpyrrolidone or vinylcaprolactam copolymers include vinylpyrrolidone/vinyl alcohol, vinylpyrrolidone/vinyl acetate, vinylpyrrolidone/acrylic acid, vinylpyrrolidone/acrylates or methacrylates, vinylpyrrolidone/vinyl caprolactam, vinylpyrrolidone/styrene copolymers and similar copolymers of VCL.

Examples of terpolymers are vinyl caprolactam/vinylpyrrolidone/methacrylamidopropyl trimethyl ammonium chloride, vinyl caprolactam/vinylpyrrolidone/dimethylaminoethyl methacrylate and those polymers which contain units of 2 or more of the above monomers in addition to the vinyl lactam monomer. In the case of water soluble vinylpyrrolidone polymers which are obtained in aqueous solution, these can be directly treated with the present acid under conditions described above to produce a polymeric product which, in most cases contains less than 1 ppm residual monomer.

An advantage of the present process is the use of an acid agent which efficiently removes residual monomer to levels heretofore unachievable The present process also extends the use of crosslinked and non-crosslinked vinyl lactam homopolymers, copolymers and terpolymers in cosmetic and pharmaceutical applications, since odorous, irritating and toxic amounts of residual monomer are removed to a substantially undetectable level.

Having generally described the present process, reference is now had to the accompanying examples which illustrate preferred embodiments but which are not intended to be limiting to the scope of the invention as more broadly set forth above and in the appended claims.

EXAMPLE 1

About one liter of crosslinked polyvinylpyrrolidone homopolymer (PVPP) slurry containing about 10% solids and about 30,000 ppm VP monomer and having a pH of about 10.5, was filtered using a Whatman filter #4 and then reconstituted to 10% solids with distilled water. The resulting slurry was agitated with a magnetic stirrer for 10 minutes and then refiltered. This washing and filtering step was repeated two additional times to remove contaminants. The pH of the slurry after washing and filtering was reduced from 10.5 to 7 and the washed sample was analyzed for monomer content Analysis showed that monomer in the wet cake was reduced from 30,000 ppm to 7,400 ppm and soluble non-crosslinked PVP in the crosslinked polymer was reduced from 0.3% to less than 0.01% (wet basis) It is apparent that multiple washings alone cannot reduce the monomer content to acceptable levels.

The above product was reslurried in distilled water to a solids content of about 10% and the pH was adjusted to 3 with 6% sulfuric acid. The resulting mixture was agitated at 90° C. for 3 hours then filtered Analysis showed that the monomer content was reduced from 7,400 ppm to an undetectable level, below 1 ppm (wet basis).

EXAMPLE 2

The pH of a linear polyvinylpyrrolidone PVP K-120 in 80% aqueous solution and containing 530 ppm of residual VP monomer was adjusted from 7 to 2.7 with 6% sulfuric acid and the resulting solution was stirred at 90° C. for 2 hours. Analysis of the acid treated solution showed that the VP monomer content was reduced from 530 ppm to less than 1 ppm.

EXAMPLE 3

Example 2 was repeated, except that an 88% solution of formic acid was substituted for sulfuric acid and the solution was adjusted to a pH of 3.4 with 88% formic acid. Analysis showed that the VP monomer content was reduced from 530 ppm to less than 1 ppm.

EXAMPLE 4

Linear polyvinylpyrrolidone containing 750 ppm VP monomer and having a K value of 120, in the form of an aqueous solution of 19.9% solids and having a pH of 5.8 was treated by adding 250 ppm of formic acid to 600 grams of the polymeric slurry to adjust the pH to 3.5. The resulting mixture was heated to 92°–95° C. with constant agitation for 4 hours, after which about 300 ppm of ammonium hydroxide (30% solution) was added to the mixture and the resulting pH was raised to 8.4. The near white colored product was analyzed for monomer content which was found to be 0.9 ppm.

EXAMPLE 5

Example 4 was repeated, except that linear polyvinylpyrrolidone containing 1,000 ppm VP monomer, having a K value of 80 (pH 9.0) and containing 24% solids was substituted for PVP K-120 above. The pH of the solution was adjusted to 3.7 with 350 ppm of formic acid. Analysis of the product showed the the monomer content was reduced to 0.9 ppm.

EXAMPLE 6

A PVP aqueous solution having a K value of 30 and a pH of about 7 and containing about 300 ppm of VP monomer was acidified to about 4 pH with 6% sulfuric acid. The reaction temperature was raised to 110° C. and the solution and acid mixed for a reaction time of 3 hours during which hydrolysis of VP takes place. The reaction was carried in pressure tubing and in a constant temperature bath.

The solution was neutralized to pH 7 after the hydrolysis reaction with 5% sodium hydroxide solution. The residual VP monomer was analyzed by High Pressure Liquid Chromatography. Results showed that residual VP in the PVP was reduced to less than 1 ppm.

The above reaction was repeated 12 times at the reaction conditions of pH 3, 4, and 5; temperatures of 110°, 90° and 70° C. for 1, 3 and 5 hours. In each case the PVP product was analyzed to have a residual VP monomer content less than 1 ppm. It was also noted that, the longer reaction times (5 hours) produced a bleaching effect so that the product had only a pale yellow tint. The color of the remaining products was pale yellow.

COMPARATIVE EXAMPLE 7

A crosslinked polyvinylpyrrolidone homopolymer (PVPP) slurry, containing about 10% PVPP solid and about 30,000 ppm VP and having a pH of between 10 and 11, was introduced into a one liter reactor wherein the pH was adjusted to 7 with concentrated sulfuric acid. Carbon dioxide acid gas was then bubbled through the neutralized slurry at a rate of about 3 ml/min for a period of 30 minutes, after which the pH was measured at 5.5. The reactor was then sealed and pressurized to 2 bars with carbon dioxide while the temperature was raised to 110° C. and the reactor was held at this temperature and pressure for 5 hours, after which the reactor was cooled to room temperature and the pressure released to one atmosphere. The carbonic acid treated slurry was filtered and the resulting wet cake analyzed by gas chromatography. Analysis showed that the residual monomer content was reduced from 30,000 to a little less than 8,000 ppm, which purification was unsuitable for the purposes of this invention.

COMPARATIVE EXAMPLE 8

Example 7 was repeated except that the pressure in the reactor was raised to 5 bars with carbon dioxide. Analysis of the resulting product showed a VP monomer reduction from 30,000 to a little less than 2,000 ppm. Thus, merely raising the pressure during carbonic acid treatment failed to provide the desired purification results.

EXAMPLE 9

A 1-liter portion of the sample described in Example 1 was filtered through a Buchner funnel using a Whatman #4 filter paper. The resulting wet cake was reconstituted with water to form a slurry containing 10% PVPP solid and introduced into a 2 liter beaker. The slurry was agitated with a magnetic bar for 10 minutes and then refiltered. This washing step was repeated 3 times and then reconstituted with distilled water. The slurry had an alkaline pH, about 7. Analysis showed that the residual VP monomer was reduced from 30,000 to 7,400 ppm while the soluble PVP was reduced from 1% to below 0.03%.

Carbon dioxide gas was then bubbled through the above washed slurry at a rate of about 3 ml/min for about 30 minutes, after which the slurry was transferred to a Buchi reactor wherein the carbon dioxide ebullition was continued for another 10 minutes to remove any residual oxygen and nitrogen gases. The pH of the slurry was about 4. The reactor was then sealed and pressurized to 5 bars with carbonic dioxide while stirring at 150 rpm and the temperature raised to 110° C. After 5 hours at this temperature and pressure, the reactor was cooled to room temperature and pressure released to one atmosphere. The reactor contents were then filtered and analyzed by high pressure liquid chromatography which showed that the VP residual monomer content was further reduced from 7,400 ppm to less than 1 ppm (25% wet cake).

EXAMPLE 10

Example 9 was repeated with another sample of the above described PVPP, except that the washed and reconstituted product was held in the reactor under said carbon dioxide pressure and elevated temperature for a period of one hour. Analysis showed that the VP residual monomer was reduced from 7,400 ppm to less than 0.6 ppm.

Repetition of Examples 9 and 10 gave similar results with residual monomer levels reduced to less than 1 ppm on a dry powder basis.

EXAMPLE 11

Linear polyvinylpyrrolidone (K-120), containing 740 ppm of vinylpyrrolidone monomer, in the form of an aqueous solution of 19.9% solids having a pH of about 6, was treated with a mixture of carbonic and formic acids In this case 250 ppm of formic acid based on PVP solution is introduced into the treating zone, the system sealed under 0.3 bar with carbon dioxide and agitated for 5 hours at 90° C. The recovered PVP product contains less than 1 ppm of unreacted monomer.

EXAMPLE 12

Crosslinked polyvinylpyrrolidone filtered wet cake (250 g.) was reconstituted a 10% aqueous slurry. The pH of the solution, about 6.5, was adjusted to about 3.5 with two drops of concentrated phosphoric acid. The resulting slurry was then heated to 90° C. and agitated with a mechanical stirrer at 75 rpm for 3 hours. The slurry was then cooled to room temperature and filtered. The product was subjected to high pressure liquid chromatography analysis, which showed that the residual VP monomer was reduced from 94 ppm to nondetectable level (<1 ppm).

EXAMPLE 13

A 20% solids of vinyl caprolactam homopolymer (20 g.) was dissolved in 100 g. of an ethanol/water (2:1) mixture. The resulting solution had a pH of 5.3 and contained 1800 ppm of residual vinyl caprolactam monomer. The pH of the solution was adjusted with formic acid to 3.5 and then heated to 90° C. for 5 hours. Analysis of the VCL monomer showed that after 5 hours, the VCL monomer was reduced from 1800 ppm to an undetectable level less than 5 ppm.

EXAMPLE 14

A 20% solids of vinyl caprolactam/vinylpyrrolidone/vinyl acetate terpolymer was dissolved in a 2:1 volume mixture of ethanol and water. The solution at 4.7 pH contained 106 ppm of vinylpyrrolidone monomer and 670 ppm of vinyl caprolactam monomer.

Formic acid was used to adjust the pH of the solution to 3.5. The acid treated solution was then heated to 90° C. for 5 hours. Analysis of the residual monomer showed that, after 3 hours both the VC and VCL were reduced to undetectable levels, less than 5 ppm.

EXAMPLE 15

Twenty grams of vinyl caprolactam/vinylpyrrolidone/methacrylamidopropyl trimethyl ammonium chloride terpolymer was dissolved in 80 g. of a 2:1 volume mixture of ethanol and water. To this solution, 2000 ppm of VP and of VCL monomers were added. The pH of the resulting solution was adjusted to 3.4 with formic acid and heated to 90° C. for 5 hours. Analysis of residual monomer showed that at 3 hours the monomers were reduced to undetectable levels, less than 5 ppm.

What is claimed is:

1. A process for the purification of a polymer of N-vinylpyrrolidone or N-vinylcaprolactam optionally substituted with lower alkyl containing up to 20,000 ppm of residual vinyl lactam monomer which comprises introducing into a reactor an alkaline aqueous solution or an aqueous slurry containing from about 1 to about 30 wt. % polymer solids; adjusting the pH of the solution or slurry to below 5 with an acid selected from the group consisting of carbonic, sulfuric, phosphoric acids and mixtures thereof; reacting said residual monomer with said acid at a temperature of from about 50° C. to about 150° C. with agitation to reduce the residual monomer to a non-contaminating level below 5 ppm and drying the treated polymer to free-flowing particulate solids.

2. The process of claim 1 wherein said polymer containing residual monomer is a polymer of N-vinylpyrrolidone.

3. The process of claim 2 wherein said polymer is a water insoluble crosslinked vinylpyrrolidone polymer in the form of an aqueous slurry containing from about 10 to about 20 wt. % solids.

4. The process of claim 2 wherein said polymer is a water soluble, non-crosslinked vinylpyrrolidone polymer in the form of an aqueous solution.

5. The process of claim 1 wherein said polymer containing residual monomer is a polymer of N-vinylcaprolactam.

6. The process of claim 5 wherein said N-vinylcaprolactam polymer is a water insoluble crosslinked polymer in the form of an aqueous slurry.

7. The process of claim 5 wherein said N-vinylcaprolactam polymer is a water soluble homopolymer or copolymer in the form of an aqueous solution.

8. The process of claim 1 wherein the acid is reacted with vinyl lactam monomer at a temperature between about 80° and about 120° C. at a pH of from about 1.2 to about 4.0.

9. The process of claim 4 wherein said polymer is linear poly(vinylpyrrolidone/vinylcaprolactam) copolymer.

10. The process of claim 4 wherein said polymer is non-crosslinked vinylpyrrolidone/vinyl acetate copolymer.

11. The process of claim 4 wherein said polymer is vinyl caprolactam/vinylpyrrolidone/vinyl acetate terpolymer.

12. The process of claim 4 wherein said polymer is vinyl caprolactam/vinylpyrrolidone/methacrylamidopropyl trimethyl ammonium chloride terpolymer 13. The process of claim 1 wherein the polymer slurry is treated with carbonic acid by introducing $CO_2$ to pressurize the system to from about 15 to about 300 psi.

14. The process of claim 13 wherein said carbonic acid treatment is effected under a $CO_2$ pressure of from about 30 to about 100 psi.

15. The process of claim 1 wherein said polymer slurry is treated with a mixture of carbonic and auxiliary formic acid in a closed, pressurized system.

16. The process of claim 1 wherein said vinyl lactam polymer is a crosslinked, water insoluble polymer in an aqueous slurry of between about 10 and about 20 wt. % solids, which slurry initially contains up to 50,000 ppm vinyl lactam monomer and wherein said slurry is first washed with water and filtered under ambient conditions to reduce the residual vinyl lactam monomer content to not more than 10,000 ppm and the slurry of between about 10 and about 20 wt. % solids is reformed prior to contact with carbonic acid at elevated temperature and pressure.

17. The process of claim 16 wherein the reformed slurry is subjected to ebullition with carbon dioxide under ambient conditions prior to treatment with carbonic acid at elevated temperature and pressure 18. The process of claim 3 wherein the polymeric slurry is contacted with carbon dioxide at a temperature of between about 80° and about 120° C., under from about 30 to about 100 psi $CO_2/H_2O$ vapor pressure for a period of from about 1 to about 5 hours to hydrolyze residual vinylpyrrolidone monomer and to provide a particulate crosslinked vinylpyrrolidone polymer containing less than 1ppm residual monomer.

19. The process of claim 1 wherein said acid is sulfuric acid

20. The process of claim 1 wherein said acid is phosphoric acid.

21. The process of claim 1 wherein said acid is employed in an amount of between about 150 and about 700 ppm/weight of monomer.

22. The process of claim 1 wherein said alkaline polymer solution or slurry is initially teraed with a mixture of carbonic acid and an auxiliary coercive $C_1$ to $c_2$ carboxylic acid at ambient temperature and pressure prior to said reaction of said monomer with acid in order to adjust the pH of the solution or slurry below 5 and then transferring the resulting acidified mixture to a sealed reactor wherein carbon dioxide gas is introduced to increase pressure and residual monomer is reached with carbonic acid at said elevated temperatures.

23. The process of claim 1 wherein said alkaline polymer solution or slurry contains 740 to 7,400 ppm lactam monomer and is initially subjected to ebullition of carbon dioxide gas to adjust the pH to less than 5 prior to reacting said residual monomer with acid, the resulting acidified mixture is then transferred to a sealed rector wherein it is pressurized with additional carbon dioxide gas to an elevated pressure up to about 5 bars and said residual monomer is reacted with carbonic acid at said elevated temperature.

* * * * *